United States Patent [19]

Sheffield et al.

[11] Patent Number: 4,718,845
[45] Date of Patent: Jan. 12, 1988

[54] RACK AND PINION GEAR STACK MOLD CONTROL

[76] Inventors: James Sheffield, 184 Mackenzie Street, Alliston, Ontario, Canada, L0M 1A0; John Rathbun, 3721 Gary Dr., Castalia, Ohio 44824

[21] Appl. No.: 18,856

[22] Filed: Feb. 24, 1987

Related U.S. Application Data

[63] Continuation of Ser. No. 847,247, Apr. 2, 1986, abandoned.

[51] Int. Cl.$^4$ .................... B29C 45/64; B29C 45/66
[52] U.S. Cl. ........................ 425/589; 74/110; 74/422; 425/450.1; 425/451; 425/451.3
[58] Field of Search ............... 74/89.17, 422, 110; 425/450.1, 451, 451.3, 581, 588, 589, 595, DIG. 221

[56] References Cited

U.S. PATENT DOCUMENTS 3,405,032  10/1968  Barrus et al. .................. 74/110
4,408,981  10/1983  Brown .......................... 425/589

*Primary Examiner*—Jay H. Woo
*Assistant Examiner*—Timothy W. Heitbrink

[57] ABSTRACT

The present invention provides in a stack mold comprising a center mold part, first and second outside mold parts moveable at both sides of the center mold part, a rack and pinion gear arrangement to move the outside mold parts. The rack and pinion gear arrangement comprises a plurality of pinion gears located at the center mold part and including a drive gear and first and second follower gears driven off the drive gear. Also provided are first and second free ended racks extending in opposite directions from the first and second outside mold parts respectively in engagement with the first and second follower gears. These follower gears reach above and below the drive gear and the first follower gear is offset to the side of the drive gear opposite that to which the free end of the first rack extends while the second follower gear is offset to the side of the drive gear opposite that to which the free end of the second rack extends.

2 Claims, 3 Drawing Figures

RACK AND PINION GEAR STACK MOLD CONTROL

This is a continuation of Application Ser. No. 06/847,247 filed Apr. 2, 1986, now abandoned.

FIELD OF THE INVENTION

The present invention relates to a stack mold and in particular a new and improved rack and pinion gear arrangement for increased opening of the stack mold.

BACKGROUND OF THE INVENTION

As known stack molds include a centre mold part, generally the female part of the mold, and two outside male mold parts which open and close relative to the centre mold part. Typically the opening and closing of these stack molds is controlled through a rack and pinion gear arrangement comprising individual racks from the two outside mold parts which are driven off one big pinion gear located at the centre mold part. The racks on the outside mold parts extend across the centre mold part only as far as the outside surface of the opposite outside mold part when the stack mold is closed. It is not desirable to increase the length on the racks beyond this point otherwise they interfere with the outside mounting surfaces for the mold parts which would then require special modifications to accomodate the increased length of the racks.

The required relatively limited length of the racks in combination with a single pinion gear for controlling rack movement results in a relatively limited opening and somewhat poor access to the stack mold which may for example make it awkward to eject the molded pieces even with the stack mold in the fully opened position.

SUMMARY OF THE PRESENT INVENTION

The present invention provides in a stack mold comprising a centre mold part, first and second outside mold parts moveable at both sides of the centre mold part, a rack and pinion gear arrangement moving the first and second outside mold parts. According to the present invention the rack and pinion gear arrangement comprises pinion gear means located at the centre mold part and including a drive gear and first and second follower gears driven off the drive gear. Also provided are first and second free ended racks extending in opposite directions from the first and second outside mold parts respectively and in engagement with the first and second follower gears. The two follower gears reach above and below the drive gear and the first follower gear is offset to the side of the drive gear opposite that to which the free end of the first rack extends while the second follower gear is offset to the side of the drive gear opposite that to which the free end of the second rack extends. This arrangement effectively increases the lengths of the racks in contact with the pinion gear arrangement and provides increased opening of the stack mold in comparison to conventional stack molds.

BRIEF DISCUSSION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
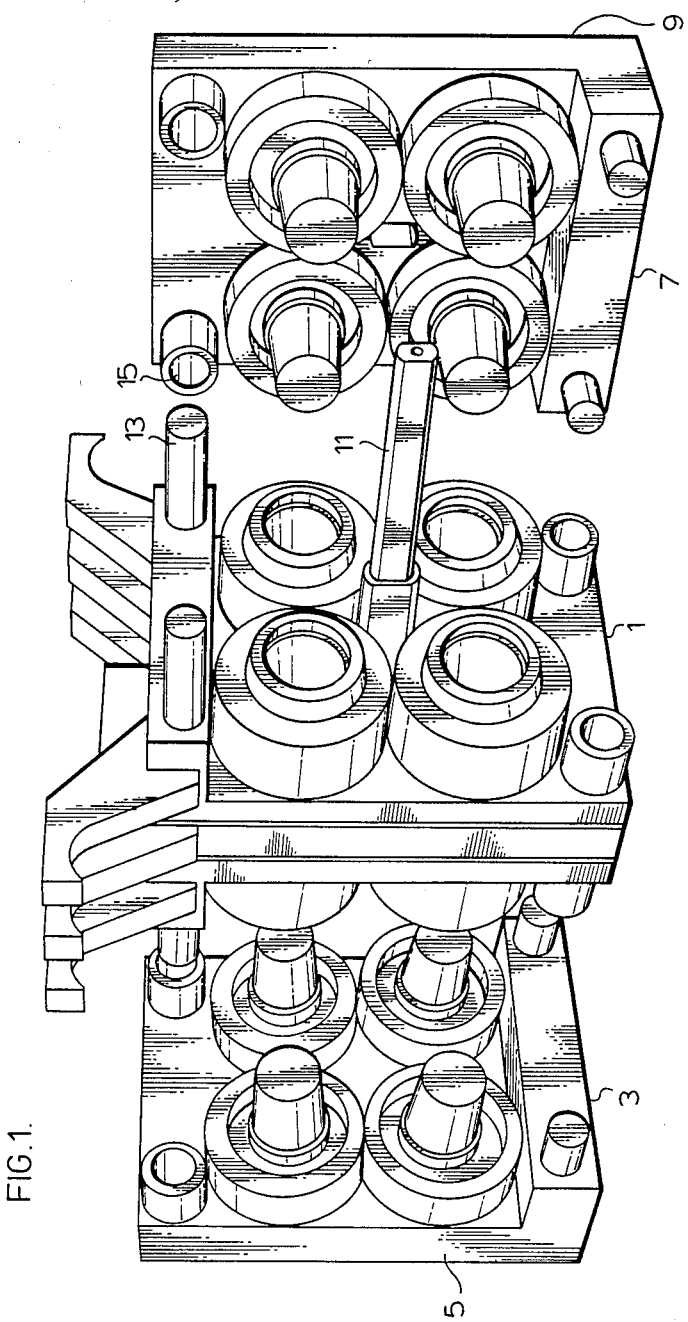
FIG. 1 is an exploded prespective view of a stack mold showing the centre female mold part and the two outside male mold parts separated from one another.

FIG. 1 shows in the exploded or open form a stack mold comprising a centre female mold part 1 with first and second outside mold parts 3 and 7 respectively. The two outside mold parts open and close relative to the centre mold part during a molding operation which comprises injecting a flowable material into the stack mold while the mold sections are closed and thereafter ejecting the pieces formed from the mold when the mold parts are opened. Note in FIG. 2 the type of pieces such as buckets B which are formed from the stack molds shown in the drawings.

In order to insure proper alignment of the outside mold parts relative to the centre mold part the stack mold further includes a guide rod 11 as well as stud and socket fittings 13 and 15 which place the male projections of the outside mold part directly over the female receptacles of the centre mold part.

Figure 2:
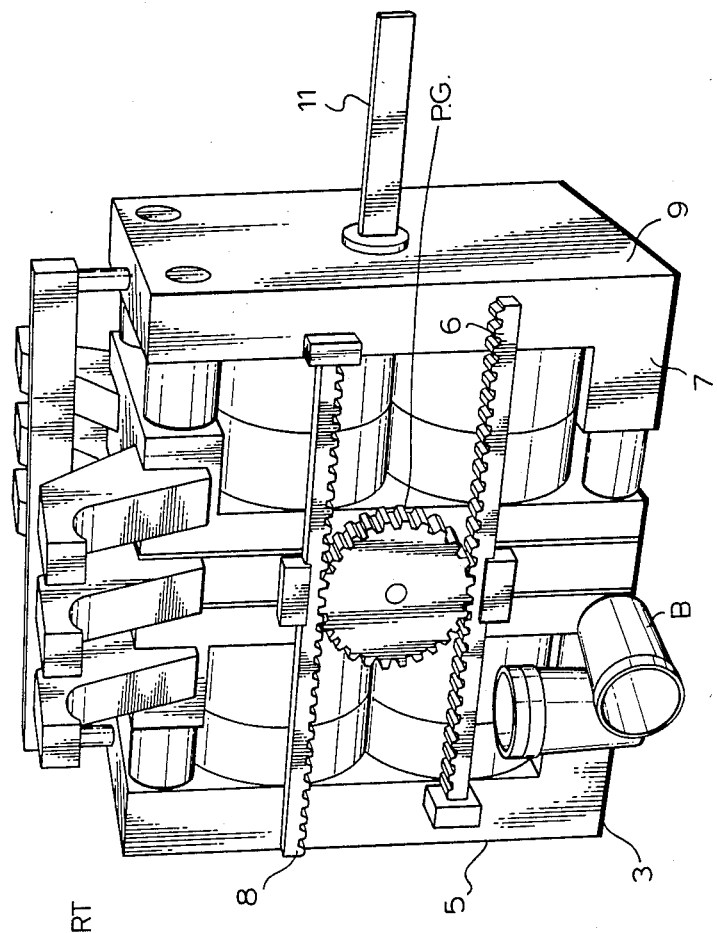
FIG. 2 is an assembled view of the stack mold of FIG. 1 showing a prior art rack and pinion gear arrangement for opening and closing of the stack mold.

FIG. 2 labeled PRIOR ART shows the conventional rack and pinion gear arrangement which is used to open and close the stack mold. This arrangement comprises one large pinion gear indicated at PG in FIG. 2 located at the centre mold part and first and second racks 6 and 8 which extend forwardly from the first and second outside mold parts 3 and 7 respectively. It is to be noted in FIG. 2 that rack 6 extends only as far as the back surface 9 of outside mold part 7 while rack 8 extends only as far as the back surface 5 of outside mold part 3. It is not desired to extend these racks past these positions since otherwise they tend to interfere with other equipment around the mold which would then require modifications to receive the extended length racks.

Staying with FIG. 2 it will be well appreciated how the outside mold parts can only open to the extent that racks 6 and 8 maintain engagement with the one large pinion gear PG. Therefore, the opening of the stack mold is directly proportional to the length of rack extending past the centre point on the pinion gear, i.e. the distance between the free end of the rack and the centre point on the pinion gear.

Figure 3:
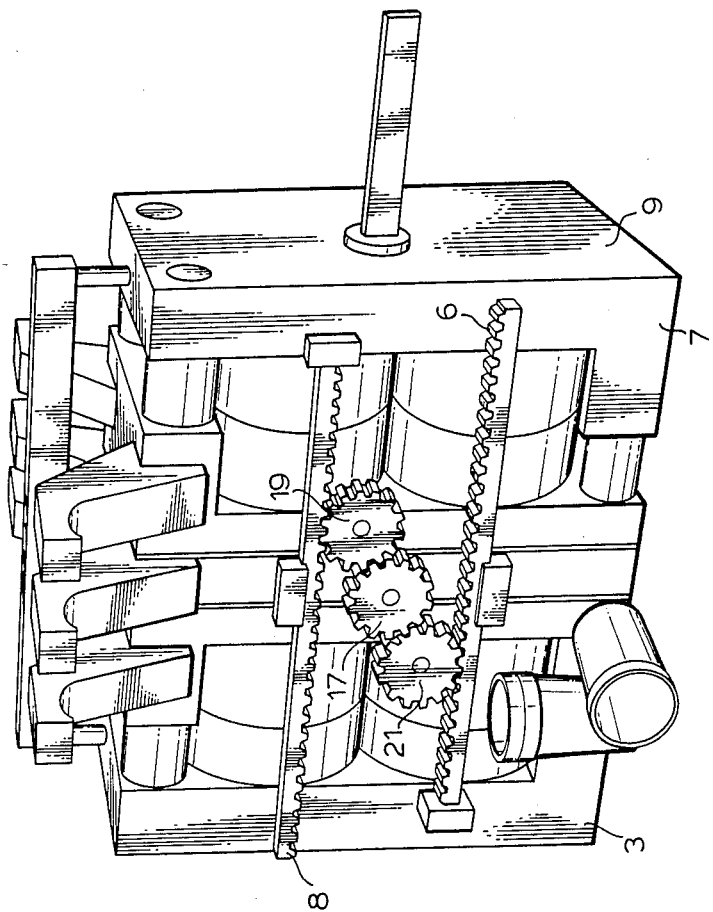
FIG. 3 is an assembled prespective view of the stack mold of FIG. 1 showing the rack and pinion gearing arrangement according to a preferred embodiment of the present invention.

The purpose of the present invention is to increase the degree to which the outside mold parts can be opened relative to the centre mold part for creating a larger clearance area to gain access to the interior of the mold and to provide greater clearance for piece ejection from the mold. FIG. 3 shows the novel rack and pinion gearing arrangement of the present invention to achieve this purpose.

More particularly as will be seen in FIG. 3 the one large pinion PG is in accordance with the present invention replaced by a plurality of pinion gears comprising a centre drive gear 17 as well as a pair of follower gears 19 and 21 driven off drive gear 17. The arrangement of the pinion gears is such that follower gear 19 reaches above and is located to the second outside mold part side of the drive gear opposite the side to which the free end of rack 8 extends. Follower gear 21 on the other hand reaches below and is located to the first outside mold part side of drive gear 17 away from the free end of rack 6. According to the arrangement shown the three pinion gears are aligned along their centre axii and the two follower gears are of the same diameter with identical teeth configuration for simultaneous and corresponding opening of the two outside mold sections. Furthermore because the two follower gears are controlled by one common drive gear the two racks are always moved in opposing directions consistent with the use of one large pinion gear as shown in FIG. 2.

By using three pinion gears and by offsetting the follower gears to the side of the drive gear away from the free end of the first and second racks the effective length of the racks for contact with the pinion gear drive is increased thereby allowing increased opening of the two outside mold parts. More specifically the effective increased length of the two racks is the distance between the centre point on the drive gear and the centre point on the individual follower gears since, the racks can now be drawn back past the drive gear while maintaining contact with the follower gears. The actual increased opening space of the mold parts is directly proportionate to the size of the gears and the diagonal or which the gears are placed.

The description above relates to the two outside mold parts moving relative to the center mold part through the use of a triple pinion gear arrangement. It is to be appreciated that this same triple pinion gear arrangement fittable to a pair of racks can equally as well be used with a mold system in which one of the outside mold parts remains stationary while the center and other end mold parts are moved by the triple pinion gear and rack system for opening and closing the mold.

Although various perferred embodiments of the invention have been described herein in detail it will be appreciated by those skilled in the art that variations may be made thereto without departing from the spirit of the invention and the scope of the appended claims.

The embodiments of the invention in which an exclusive property or privilege claimed are defined as follows:

1. A rack and pinion gear arrangement for movement of first and second outside mold parts relative to a centre mold part in a stack mold, said rack and pinion gear arrangement comprising pinion gear means located at said centre mold part, said pinion gear means including a drive gear, first and second follower gears driven off said drive gear and first and second free ended racks extending in opposite directions from said first and second outside mold parts respectively and in engagement with said first and second follower gears, said follower gears reaching above and below said drive gear and said first follower gear being offset to a first side of said drive gear opposite that to which the free end of said first rack extends and said second follower gear being offset to a second side of said drive gear opposite that to which the free end of said second rack extends for opening and closing said stack mold.

2. A rack and pinion gear arrangement for opening and closing a stack mold having a center mold part with first and second outside mold parts to either side of said center mold part with relative movement between all of said mold parts, said rack and pinion gear arrangement comprising a center pinion gear and upper and lower pinion gears meshed with and off-set to either side of said center pinion gear and first and second free ended racks extending in opposite directions from said first and second outside mold parts and in engagement with said upper and lower pinion gears for opening and closing said stack mold.

* * * * *